United States Patent [19]

Furukawa

[11] Patent Number: 5,607,610
[45] Date of Patent: Mar. 4, 1997

[54] COMPACT PROTECTOR

[75] Inventor: Hideharu Furukawa, Gotemba, Japan

[73] Assignee: Texas Instruments Incorporated, Dallas, Tex.

[21] Appl. No.: 417,344

[22] Filed: Apr. 5, 1995

[30] Foreign Application Priority Data

Apr. 5, 1994 [JP] Japan .................... 6-090559

[51] Int. Cl.$^6$ ........................ H05B 1/02
[52] U.S. Cl. .............. 219/505; 219/511; 219/512; 219/488; 337/100; 337/102
[58] Field of Search .............. 219/508, 504, 219/509, 505, 511, 512, 494, 488, 481, 491; 337/100, 104, 102

[56] References Cited

U.S. PATENT DOCUMENTS

| 4,201,735 | 5/1980 | Byam | 219/207 |
| 4,394,646 | 7/1983 | Goessler | 200/61.58 |
| 4,413,174 | 11/1983 | Ting | 219/511 |

FOREIGN PATENT DOCUMENTS

| 564150 | 10/1993 | European Pat. Off. . |
| 1324518 | 7/1963 | France . |
| 2113388 | 10/1971 | Germany . |
| 998538 | 7/1965 | United Kingdom . |
| 1342274 | 1/1974 | United Kingdom . |

OTHER PUBLICATIONS

Patent Abstracts of Japan, vol. 016 No. 324 (E–1234), 15 Jul. 1992 & JP-A-04 095324 (Matsushita Electric Ind Co. Ltd.) 27 Mar. 1992.

*Primary Examiner*—Mark H. Paschall
*Attorney, Agent, or Firm*—Russell E. Baumann; Richard L. Donaldson; René E. Grossman

[57] ABSTRACT

A compact protector device having a housing 10 with a fixed electrode 18 and terminal member 12 and a movable electrode 26 and terminal member 14 contained therein. The movable electrode 26 includes a thermostatic bimetal member 26a with a movable contact 28 attached thereto positioned to engage and disengage with a fixed contact 20 attached to the fixed electrode 18 upon action of the bimetal member 26c. A positive temperature coefficient (PTC) element 24 is positioned in direct heat transfer relationship with the bimetal member 26c and electrically connected between the fixed and movable electrodes 18, 26. The protector further includes an insulating member 22 for compressively holding the movable electrode 26 in electrical contact with the PTC element 24 and forming a fulcrum point for action of said bimetal member 26c.

8 Claims, 3 Drawing Sheets

COMPACT PROTECTOR

FIELD OF THE INVENTION

This invention relates to a protective device with a "hold open" feature to guard against overcurrent and overheating conditions.

BACKGROUND OF THE INVENTION

It has been known in the prior art to use protective devices for the protection of electrical instruments such as rechargeable battery units, electric motors, etc., wherein such devices maintain a "self hold" or "contacts open" states by the use of a positive temperature coefficient (PTC) element in the device for providing heat generation even when the contacts are open and the current through them is shut off.

Typically, this type of protection device is constructed by having two terminals with a snap acting bimetal member with a movable contact fixed to one of the terminals. The other terminal has a fixed contact attached to it which is positioned such that the movable contact on the bimetal member generally is in contact with the fixed contact. Additionally, positioned between the two terminals a PTC element is held in place by an electrically conductive spring member. Upon an overcurrent and overheating occurrence, the bimetal is heated and snaps to a position in which the movable and fixed contacts are no longer in contact with each other and thus the voltage between the terminals is impressed completely across the PTC element. The PTC element then becomes heated to a fixed temperature which holds the contact in the "open state". In such a device, an electroconductive spring plate has been required for electrically holding the PTC element between the terminals. This structure is more expensive to produce and increases the overall thickness of the device.

SUMMARY OF THE INVENTION

Accordingly, it is an object of the present invention to provide a protector device having a thin small package size with a reduced number of parts which is stable and reliable in operation.

Another object of the present invention is to provide a compact protector device with a "self hold" feature.

Accordingly, a compact protector device for a load with a self hold feature of the present invention comprises a housing, a fixed and a movable electrode means contained within said housing with one of said electrode means for connection to said load and the other for connection to a source of electric power, said movable electrode means including a heat responsive bimetal member having a movable contact attached thereto and positioned to engage and disengage upon action of said bimetal member with a fixed contact attached to said fixed electrode means, a positive temperature coefficient (PTC) element positioned spaced apart of said contacts in direct heat transfer relationship with said bimetal member between said fixed and said movable electrode means and electrically connected in parallel with a current path between said fixed and movable electrode means through said fixed and movable contacts so as to carry significant current between the electrodes when said fixed and movable contacts are disengaged thereby supplying generally constant heating to said bimetal member, and an insulating holding means compressively holding said movable electrode means in electrical contact with said PTC element and forming a fulcrum point for action of said bimetal member.

In accordance with a second aspect of this invention, a compact protector device for a load comprises a housing, a fixed and a movable electrode means contained within said housing with one of said electrode means for connection to said load and the other for connection to a source of electric power, said movable electrode means including a heat responsive bimetal member having a movable contact attached thereto and positioned to engage and disengage upon action of said bimetal member with a fixed contact attached to said fixed electrode means, and an insulating holding means having a flat bottom portion fixed to said fixed electrode means, a post portion extending vertically upward from said flat bottom portion of said insulating holding means and a block portion also extending vertically upward from said flat bottom portion but to a height less than the height of said post portion and positioned between said post portion and said contacts in said device, said post portion being received in an aperture in said movable electrode means and having a deformed top portion at the distal end for compressively holding said movable electrode means against a top contact surface of said block portion for accurately positioning said fixed electrode means and said movable electrode means relative to one another and to form a fulcrum point for action of said bimetal member.

With the above described protection devices the movable electrode means is compressively held in place for precise alignment of the device parts one to another and a constant, precise fulcrum point is established for accurate action of the bimetal element. A limited member of parts are used allowing for a compact design.

DESCRIPTION OF THE DRAWINGS

Other objects, advantages and details of protective devices of this invention appear in the following detailed description of the preferred embodiments of the invention and the detailed description referring to the drawings in which.

DETAILED DESCRIPTION OF THE PREFERRED EMBODIMENTS

Figure 1:
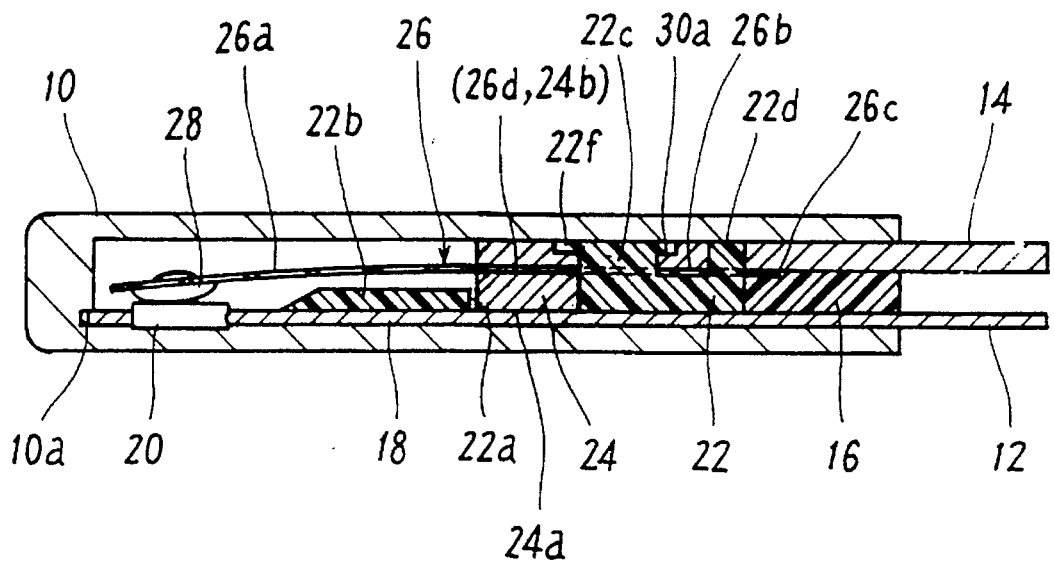
FIG. 1 is a longitudinal cross section of a protective device of the present invention with the contacts being in the closed state.

A protective device in an embodiment of the present invention has a flat box shaped housing or casing 10 having an open and a closed end made from an electrically insulating material such as nylon which accommodates the essential parts of the device. A pair of connective terminals 12 and 14 made from an electrically electroconductive material such as brass or the like are partially contained within casing 10 with one end of each terminal protruding from the open end of case 10. The open end of casing 10 is tightly closed or sealed with an electrically insulating resinous material 16 such as an epoxy which tightly holds terminals 12 and 14 in place.

In the casing 10, an electroconductive plate 18 is provided which extends from connective terminal 12 along a bottom surface of the inner wall of the casing 10 to the closed end of casing 10 and acts as a fixed electrode for the protector. A fixed contact 20 made, for example, of a silver alloy is joined near the end of this fixed electrode adjacent the closed end of the casing. The tip of the fixed electrode 18 is inserted into and fixed in a groove 10*a* that has been formed on the closed end of casing 10 to thereby firmly hold fixed electrode 18 in a straight line positioned along the surface of the inner wall of the casing and to position the fixed contact 20 at a preselected location.

Adjacent sealing resinous material 16 extending inward toward the closed end of casing 10 positioned on fixed electrode 18, an electrically insulating resin block is provided. Preferably, resin block 22 is joined with the fixed electrode 18. An opening 22*a* is preferably formed at the middle part of this resin block 22 and, in this opening 22*a*, a PTC thermistor element 24 is installed. Typically, PTC element 24 is a flat parallelepiped body in which its lower half is contained within opening 22*a*. A lower electrode terminal face 24*a* of PTC element 24 is in electrical contact with fixed electrode 18 by conventional means such as an electroconductive silver epoxy. It is to be understood however, if a device of the present invention is not to have a "self hold" feature, opening 22*a* and PTC element 24 can be replaced with an insulating block member in the shape of PTC element 24. This block is preferably formed integrally as part of resin block 22.

Figure 3:
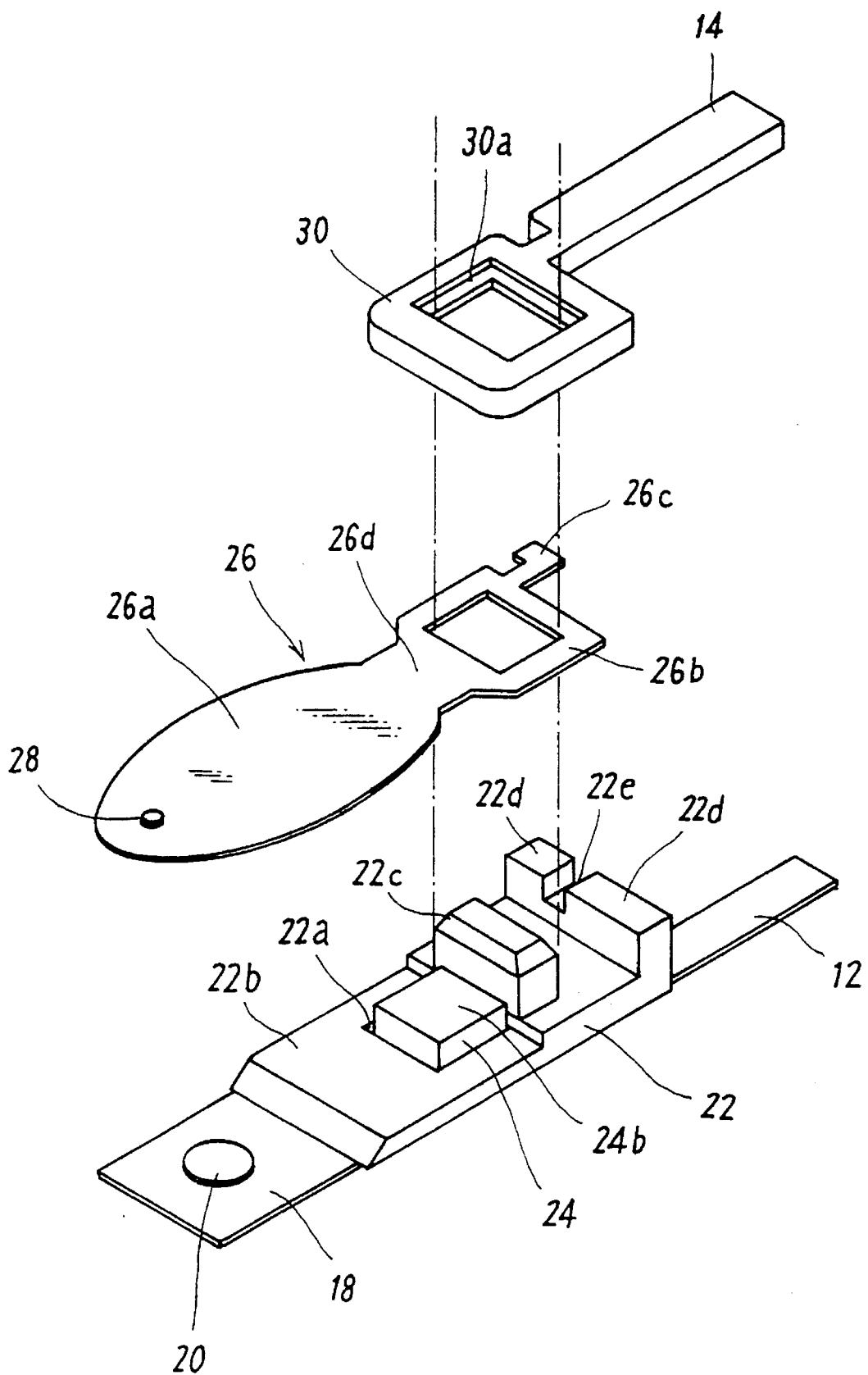
FIG. 3 is an expanded oblique view of an essential part of the protector device of FIG. 1 in an unassembled state.

As shown in FIG. 3, resin block has a base portion 22*b* which extends from terminal 12 to near the position of fixed contact 20 totally surrounding opening 22*a*. This base portion 22*b* covers fixed electrode 18 except when the opening 22*a* is provided within base portion 22*b*. A front part of base portion 22*b* toward the closed end of casing 10 has a thickness which is smaller than the thickness of the PTC element 24. Because of this fact, PTC element 24 is made adiabatic from the fixed electrode 18 and its surroundings, so that the heating of the positive property element 24 is effectively directed to movable electrode 26 as will be described later.

Resin block 22 has a square pillar or post portion 22*c* arising from a slightly raised portion of base portion 22*b* positioned adjacent opening 22*a* away from the closed end of casing 10. Pillar portion 22*c* has a height from fixed electrode 18 which is higher than a top electrode terminal face 24*b* of PTC element 24. Additionally, there is an end portion 22*d* of block 22 which extends upwardly to a height higher than the top electrode terminal face 24*b* of PTC element 24 (generally of the same height as pillar portion 22*c*) positioned adjacent to sealing resin 16 generally where terminal 12 and fixed electrode 18 are joined. In end portion 22*d* there is a groove 22*e* formed for receiving the external connective terminal 14 and a movable electrode 26.

Movable electrode 26 is made of an electrically conductive material and has a bimetal part 26*a* typically in a generally oval shape. An engagement part 26*b* in the shape of an open square ring or a frame is integrally connected by a base portion 26*d* to bimetal 26*a* and a hook-shaped engagement part 26*c* extends outward from one end of frame-shaped engagement part 26*b* opposite to base portion 26*d*. At the tip of the bimetal 26*a* farthest away from engagement part 26*c*, a movable contact 28 typically made of a silver alloy is mounted on bimetal part 26*a*. Movable electrode 26 is positioned in such a manner on block 22 that pillar portion 22*c* of block 22 is received in the opening of the frame-shaped engagement part 26*b* and that the hook-shaped engagement part 26*c* is received in groove 22*e* of wall 22*d*. Further, electrode 26 is installed so that the base portion 26*d* of the bimetal part 26*a* is placed on top of the electrode terminal face 24*b* of PTC element 24 with movable contact 28 in engagement with fixed contact 20.

Moreover, the surface between both of the raised surfaces 22*c* and 22*d* is lower than the top electrode terminal face 24*b* of PTC element 24 to thereby provide that the movable electrode 26 does not compressively adhere to the surface of resin block 22.

Figure 4:
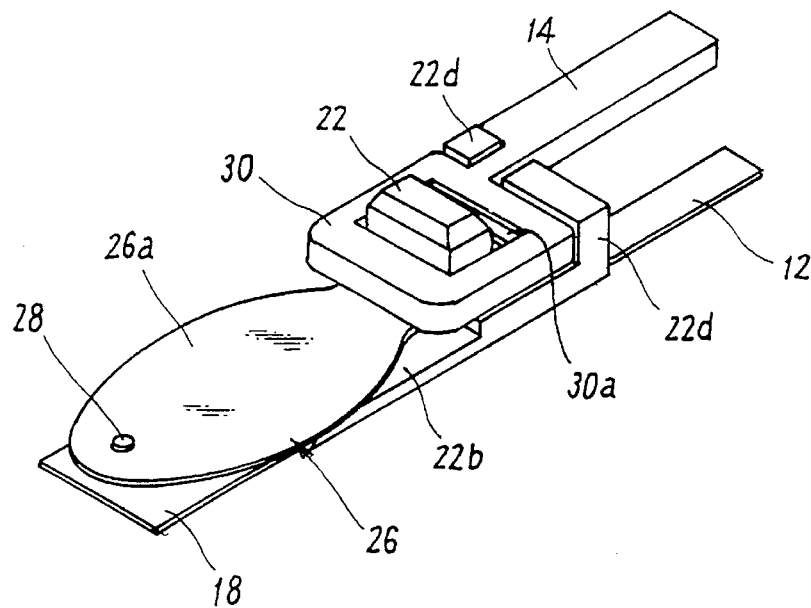
FIG. 4 is an oblique view of the essential part of FIG. 3 in an intermediate assembled state.

External connective terminal 14 has a holding part 30 which is in the shape of a hollow square ring or a frame which extends from and is integrally formed therewith. At the peripheral part of the central opening of this frame-shaped holding part 30, a groove or cavity 30*a* is provided around such opening. As shown in FIG. 4, this frame-shaped holding part 30 is super-imposed on frame-shaped engagement part 26*b* of movable electrode 26 with a neck portion between part 30 and terminal 14 being received in groove 22*e* of wall 22*d* along with hook-shaped engagement part 26*c*.

Figure 5:
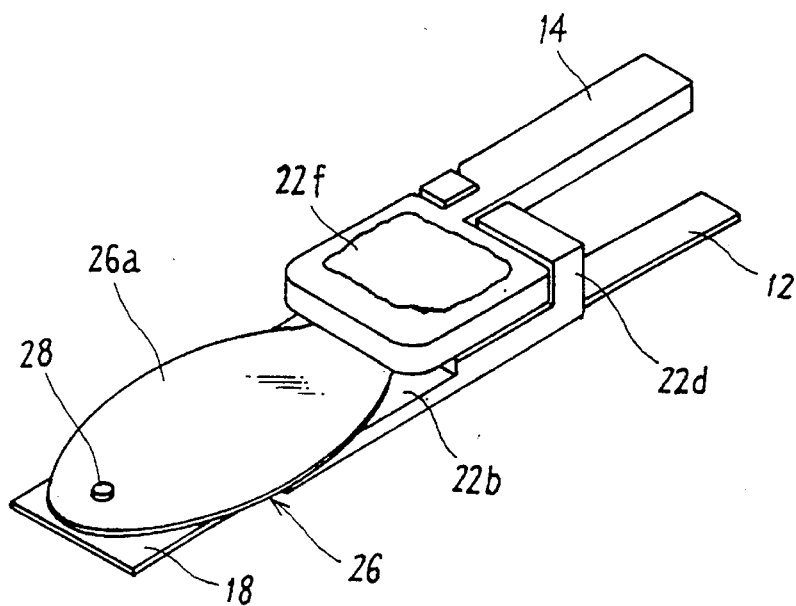
FIG. 5 is an oblique view of the essential part of FIG. 3 in an assembled state.

As shown in FIG. 5, a portion of pillar portion 22*c* of the resin block 22 is staked typically by heat or ultrasonic means to fill the cavity 30*a* of the frame-shaped holding part 30 thereby compressively holding movable electrode 26 and specifically base 26*d* to the upper electrode terminal face 24*b* of PTC element 24. Accordingly, an electric connection is formed between the PTC element 24 and the movable electrode 26 and, at the same time, a fulcrum for the displacement of the bimetal part 26*a* of movable electrode 26 is formed. In the case of a device without PTC element 24 as mentioned above, movable electrode 26 and specifically base 26*d* would be compressively held against the upper flat surface of the block member replacing PTC element 24.

When the complete assembly as shown in FIG. 5 is inserted into the casing 10, the upper surface of the frame-shaped holding part 30 and/or the upper surface of deformed pillar portion 22*c* of the resin block 22 are caused to compressively adhere to the surfaces of the inner walls of the casing 10. The parts of the protector are now precisely located with respect to one another within the casing.

The operation of the protective device of the present invention will now be explained below. The protective device is connected in series with an electric source (not shown) where, for example, it is to be used for the prevention of damage to the coils of an electric motor. Accordingly, either one of the two external connective terminals 12 and 14 is connected to a terminal of the motor and the other is connected to the terminal of the electric source. In addition, the casing 10 is positioned in the neighborhood of the motor coil.

In the normal original state, bimetal 26*a* of the movable electrode 26 holds movable contact 28 in electrical contact engagement to fixed contact 20. The electric current that flows from the terminal 14 in this original state to terminal 12 passes through the frame-shaped holding part 30, the frame-shaped engagement part 26*b* of the movable electrode 26, the base 26*d* and the bimetal part 26*a*, the movable contact 28, the fixed contact 20 and the fixed electrode 18.

When the electric current starts flowing, bimetal 26*a* is heated mainly by its own resistance heating and to a much lesser extent by the resistance heating of the conductors around it, in addition to the heat it receives from the motor coils through casing 10. Despite such heating, the bimetal part 26a remains at its original position with the contacts in the closed state unless the temperature reaches an action temperature due to an overcurrent and/or overheat condition so that the electric current flows between both electrodes 18 and 26 with no substantial electric current flowing through the PTC element 24 and thus the element is scarcely heated.

Figure 2:
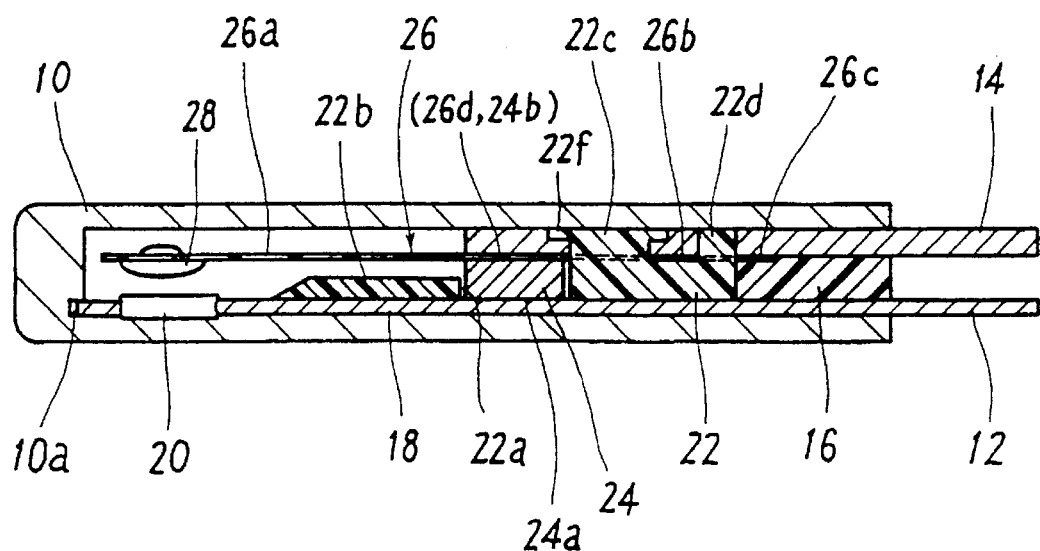
FIG. 2 is a longitudinal cross section of the protective device of FIG. 1 with the contacts being in the open state.

When the action temperature is reached due to heating by an overcurrent or by the heating of the load, the bimetal element 26a is displaced and snaps so that its tip is elevated, as is shown in FIG. 2. Because of the displacement of the bimetal part 26a, the movable contact 28 becomes separated from the fixed contact 20, thereby bringing about an open contact state which stops the flow of current between the contacts.

With the contacts in the open state in this manner, the voltage between both electrodes 18 and 26 is impressed to PTC element 24 and it starts to conduct electricity with a result that heating takes place. By proper choice of characteristics for PTC element 24, it will function as a fixed temperature heater. Due to the device design, the heat from the PTC element 24 is effectively all transmitted to the bimetal part 26b.

The heating of PTC element 24 as described above results in the bimetal 26a element being held at the displaced position and the two contacts 20 and 28 are maintained in the state of being separated from each other.

In order to remove this self-maintained open state of the contacts (self hold condition), it is necessary to terminate the voltage that is impressed between both of the external connective terminals 12 and 14 to allow the bimetal element to cool down unless it is possible to cool it down by reducing the load or cooling the protector.

In the protective device of this embodiment which has been described above, the resin block 22 which has been fixed to the fixed electrode 18 is staked by heat or the like to the cavity 30a of the frame-shaped holding part 30, and the movable electrode 26 is caused to compressively adhere to the surface of the upper electrode terminal 24b of PTC element for good electric connection and to form a fulcrum point for the displacement of the bimetal part 26a of the movable electrode 26.

According to such a construction, the PTC element 24 can maintain satisfactory electric contact with movable electrode 26 not only in the state of the contact being closed but also in the state of the contact being opened. Base part 26d of movable electrode 26 is always compressively in contact with contact surface 24b of PTC element 24.

In view of the fact that the bimetal part 26a of the movable electrode 26 is maintained in contact with PTC element 24 not by binding but by compressive adhesion at its base part 26d, it is not restricted by the thermal expansion, thereby making it possible to carry out the action (displacement) of the bimetal in a smooth fashion and guaranteeing a stable and accurate contact opening and closing action.

Moreover, there is no need to provide for an electroconductive spring between the two electrodes 18 and 26, with a result that it becomes possible to construct a thinner rigid assembly with a smaller number of parts, thereby reducing the size and thickness of the device as a whole including the casing 10.

In the above described embodiment, a bimetal 26a was formed as a part of the movable electrode 26. However, it is possible to constitute the movable electrode and the bimetal separately, with the movable electrode being caused to be displaced by the displacement of the bimetal. In such a case, it will be possible to adopt a construction in which the movable electrode is caused to compressively adhere to the PTC element at a prescribed location.

In the above described embodiment, the installation hole 22a of the resin block 22 was made rectangular for the purpose of installing the positive characteristic thermistor which was a flat rectangular parallelopipedon. In the case where a positive characteristic thermistor in the shape of a disc is to be used, the installation hole 22a can be made in a circular shape. Further, a plurality of PTC element can be installed.

In the above described embodiment, the holding part 30 was formed integrally with the external connective terminal 14, thereby reducing the number of parts required. However, it will be possible to form both of them separately.

It should be understood that although a generally particular embodiment of this invention has been described by way of illustrating the invention, the invention includes all modifications and equivalents of the disclosed embodiments falling within the scope of the appended claims.

I claim:

1. A compact protector device for a load with a self hold feature comprising a housing, a fixed and a movable electrode means contained within said housing with one of said electrode means for connection to said load and the other for connection to a source of electric power, said movable electrode means including a heat responsive bimetal member having a movable contact attached thereto and positioned to engage and disengage upon action of said bimetal member with a fixed contact attached to said fixed electrode means, a positive temperature coefficient (PTC) element positioned spaced apart of said contacts in direct heat transfer relationship with said bimetal member between said fixed and said movable electrode means and electrically connected in parallel with a current path between said fixed and movable electrode means through said fixed and movable contacts so as to carry significant current between the electrodes when said fixed and movable contacts are disengaged thereby supplying generally constant heating to said bimetal member, and an electrically insulating holding means compressively holding said movable electrode means in electrical contact with said PTC element having a flat bottom portion fixed to said electrode means with an aperture therein for receiving said PTC element to provide heating to said movable electrode means, said PTC element having a bottom surface extending through the aperture in said flat bottom portion electrically contacting said fixed electrode, and a post portion extending vertically upward from said flat bottom portion of said insulating holding means on the opposite side of said PTC element from said contacts, said post portion being received in an aperture in said movable electrode means and having a deformed top portion at the distal end for compressively holding said movable electrode means against a top contact surface of said PTC element, thereby forming a fulcrum point for action of said bimetal member.

2. A compact protector device of claim 1 wherein said housing has a inner wall surface which compressively engages said fixed and movable electrode means and said insulating holding means.

3. A compact protector device of claim 1 wherein said movable electrode means comprises said bimetal member and a terminal portion and said stationary electrode means comprises a plate portion and a terminal portion, said terminal portions extending out from said housing.

4. A compact protector device of claim 3 wherein said housing has an open and a closed end in which said open end is sealed around said terminal portions extending therefrom with an electrically insulating material and said closed end has a groove for precisely positioning said fixed electrode means.

5. A compact protector device for a load comprising a housing, a fixed and a movable electrode means contained within said housing with one of said electrode means for connection to said load and the other for connection to a source of electric power, said movable electrode means including a heat responsive bimetal member having a movable contact attached thereto and positioned to engage and disengage upon action of said bimetal member with a fixed contact attached to said fixed electrode means, and an electrically insulating holding means having a flat bottom portion fixed to said fixed electrode means, a post portion extending vertically upward from said flat bottom portion of said insulating holding means and a block portion also extending vertically upward from said flat bottom portion but to a height less than the height of said post portion and positioned between said post portion and said contacts in said device, said post portion being received in an aperture in said movable electrode means and having a deformed top portion at the distal end for compressively holding said movable electrode means against a top contact surface of said block portion for accurately positioning said fixed electrode means and said movable electrode means relative to one another and to form a fulcrum point for action of said bimetal member.

6. A compact protector device of claim 5 wherein said housing has a inner wall surface which compressively engages said fixed and movable electrode means and said insulating holding means.

7. A compact protector device of claim 5 wherein said movable electrode means comprises said bimetal member and a terminal portion and said stationary electrode means comprises a plate portion and a terminal portion, said terminal portions extending out from said housing.

8. A compact protector device of claim 7 wherein said housing has an open and a closed end in which said open end is sealed around said terminal portions extending therefrom with an electrically insulating material and said closed end has a groove for precisely positioning said fixed electrode means.

* * * * *